Patented Mar. 23, 1948

UNITED STATES PATENT OFFICE 2,438,461

CUTTING OIL COMPOSITION

Jere C. Showalter, Goose Creek, Tex., assignor to Standard Oil Development Company, a corporation of Delaware No Drawing. Application August 3, 1944,
Serial No. 547,972

14 Claims. (Cl. 252—33.2)

The present invention is directed to a composition suitable for use as an emulsion with water for the lubrication of cutting tools.

It is conventional to the art to employ an emulsion comprising a minor portion of emulsible oil and a major portion of water when cutting metals. The composition emulsified in the water is usually an oil and is customarily referred to as a cutting oil, although it will be understood that such compositions may be in a paste form.

One of the necessary characteristics of a cutting composition is that it form a stable emulsion with water. Another essential characteristic is that it resist the formation or the tendency to form substantial amounts of foam or froth upon agitation when exposed to the atmosphere. The Federal specifications for cutting oil, VV-O-261, section 4, part 5, exemplify the requirements in the art for a suitable cutting oil and require that after the cutting composition has been stirred with water it must have no air bubbles after standing for 15 minutes and that the emulsion must be able to stand for 24 hours without separation in order to pass the emulsion test.

The composition of the present invention is emulsifiable with water and conforms to the requirements in the art of cutting oils as to emulsibility and foam resistance and comprises a major portion of a relatively cheap and plentiful petroleum fraction.

The composition of the present invention comprises a major portion of a neutralized sulfonated aromatic type oil and a minor portion of a metal salt of stearic acid. A large number of metal salts of stearic acid is known to the art and will be found suitable for use in the composition of the present invention. Specific examples of such metal salts of stearic acid are zinc stearate, aluminum stearate and lead stearate. The aromatic type oil is obtained as the extract when solvent extracting a naphthenic petroleum, and this extract fraction is sulfonated by treatment with sulfuric acid and then blown with air and neutralized. The composition may also include addition agents, such as a corrosion inhibitor of the type of cyclohexylamine, and an emulsion promoter of the type of a polyhydric alcohol, such as diethylene glycol or glycerine, and tall oil. The essential ingredients of the cutting composition are the major portion of neutralized sulfonated aromatic type oil obtained by solvent extraction of a naphthenic type petroleum and the minor portion of a metal salt of stearic acid. Usually the neutralized sulfonated oil will be present in amounts ranging from 90% to 98% of the composition and the metal salt of stearic acid will be present in amounts ranging from 5% to 0.1% of the composition. It will be found that if the cutting composition is prepared in the form of an oil, the metal salt of stearic acid may conveniently be present in amounts ranging from 0.1% to 1% of the composition, or if it is desired to have the composition in the form of a paste, the metal salt of stearic acid may be present in amounts ranging from 2% to 5% of the composition.

As an example of a specific composition, in accordance with the present invention, which was found to be an excellent cutting oil may be mentioned one which included an extract obtained by phenol extracting a Coastal distillate of 200 seconds Saybolt viscosity at 100° F. The solvent-free extract was treated with two successive dumps of 40 pounds of acid per barrel of oil; after each acid application the sludge was withdrawn, and after the second treatment of acid with withdrawal of the sludge the resulting sulfonated oil was blown with air to sweeten it and the sweetened oil was neutralized with sodium hydroxide. 97.05% volume of this sulfonated and neutralized extract was admixed with 1% of tall oil, 1% diethylene glycol, .7% cyclohexylamine and .25% of aluminum stearate. This composition was treated for foam resistance by agitating 15 cc. of the composition and 45 cc. of water at a temperature of 75° F. and then allowing it to stand. The foam was found to break immediately upon standing.

In a second typical composition the sulfonated naphthenic oil fraction was obtained by phenol extracting a Coastal distillate having a Saybolt viscosity of 85 seconds at 100° F. The extract was sulfonated by treating it with 10 successive dumps of acid with 40 pounds of acid per dump and removal of sludge between each application of acid. The residual acid oil was blown with air to sweeten it and then was neutralized with sodium hydroxide. A composition was formed including 97.05% of the neutralized sulfonated oil, 1% tall oil, 1% diethylene glycol, .7% cyclohexylamine and .25% aluminum stearate. Upon testing this composition for foaming resistance by admixing 15 cc. of the composition with 45 cc. of water at a temperature of 75° F. and stirring, it was found that upon allowing the stirred mixture to settle for 15 minutes only 0.5 cc. of foam remained.

As another specific example of a cutting compositon in accordance with the present invention, a neutralized sulfonated naphthenic extract of the character used in either of the preceding compositions may be admixed with from 2% to 5% by weight of a metal salt of stearic acid and heated to 190° F. The admixture of the neutralized sulfonated extract and metal salt of stearic acid in this proportion forms a paste upon heating as described, and this paste may be emulsified with water to form a cutting composition.

It may be mentioned that it is conventional to employ carnauba and candelilla wax as foam-suppressing agents in cutting oils. However, when a cutting composition has as its principal ingredient a neutralized sulfonated oil obtained by sulfonating and then neutralizing an extract of a naphthenic petroleum, a metal salt of stearic acid has foam-inhibiting characteristics superior to the foam-inhibiting characteristics of the conventional anti-foaming agents. The foam-inhibiting characteristics of metal salts of stearic acid are particularly marked when the cutting composition comprises a neutralized sulfonated extract obtained from the more viscous naphthenic petroleums. If the naphthenic petroleum has a viscosity no greater than 75 Saybolt seconds, a satisfactory cutting composition may be obtained by the use of the conventional anti-foaming agents, such as carnauba or candelilla wax, although substantially larger amounts of these conventional agents are required to produce a satisfactory cutting composition than is needed when using a metal salt of stearic acid as the foam-suppressing agent in the composition. The superiority of the metal salts of stearic acid over the conventional anti-foaming agents increases with the viscosity of the oils used as the principal ingredient in the cutting composition and if the naphthenic oil from which the extract is obtained has a viscosity as great as 200 seconds Saybolt, these conventional agents become so ineffective that a satisfactory cutting composition cannot be obtained when using these conventional agents.

The superiority of metal salts of stearic acid over conventional anti-foaming agents when preparing cutting oils having as the principal ingredient a sulfonated extract from a high viscosity naphthenic oil is shown by the following example. A composition was formed including 96.6% of neutralized sulfonated extract identical with that employed in the second example, 1% tall oil, 1% diethylene glycol, .7% cyclohexylamine and .7% candelilla wax. When 15 cc. of this composition was stirred with 45 cc. of water and allowed to stand 15 minutes, the admixture was found to have retained 22 cc. of foam. A composition having these foam characteristics is not a satisfactory cutting composition.

The nature and objects of the present invention having been described, what I wish to claim as new and useful and to secure by Letters Patent is:

1. A composition of matter capable of forming a substantially stable aqueous emulsion comprising a major portion of a sodium hydroxide neutralized sulfonated extract of a naphthenic type petroleum oil and a metal salt of stearic acid in an amount sufficient to prevent foaming of the emulsion.

2. A composition of matter capable of forming a substantially stable aqueous emulsion comprising not less than 95% of a sodium hydroxide neutralized sulfonated extract of a naphthenic type petroleum oil and a metal salt of stearic acid in an amount sufficient to prevent foaming of the emulsion and no more than 5% of the composition.

3. A composition in accordance with claim 2 in which the metal salt is zinc stearate.

4. A composition in accordance with claim 2 in which the metal salt is aluminum stearate.

5. A composition in accordance with claim 2 in which the metal salt is lead stearate.

6. A substantially stable emulsion comprising a major portion of water and a minor portion of a sodium hydroxide neutralized sulfonated extract of a naphthenic type petroleum oil and a metal salt of stearic acid in an amount sufficient to prevent foaming of the emulsion.

7. A substantially stable emulsion comprising a major portion of water, a minor portion of a sodium hydroxide neutralized sulfonated extract of a naphthenic type 200 Saybolt seconds viscosity at 100° F. petroleum oil and a metal salt of stearic acid in an amount sufficient to prevent foaming of the emulsion.

8. A composition in accordance with claim 7 including approximately three parts of water to one part of neutralized sulfonated extract of naphthenic type petroleum oil.

9. A composition in accordance with claim 7 in which the metal salt of stearic acid is present in an amount within the range of 2 to 5% by weight of the neutralized sulfonated extract of naphthenic type petroleum oil.

10. A composition in accordance with claim 7 comprising approximately three parts of water for each part of neutralized sulfonated extract and in which the metal salt is present within the range of 2 to 5% by weight of the neutralized sulfonated extract.

11. A composition of matter capable of forming a substantially stable, non-foaming aqueous emulsion consisting of a metal salt of stearic acid in an amount within the range of 2% to 5% and a sodium hydroxide neutralized sulfonated extract of a naphthenic type petroleum oil.

12. A composition of matter capable of forming a substantially stable, non-foaming aqueous emulsion comprising approximately 97% of a sodium hydroxide neutralized sulfonated extract of a naphthenic type petroleum, approximately 0.25% aluminum stearate and approximately 2% of an emulsion promoter comprising a polyhydric alcohol and tall oil.

13. A composition of matter capable of forming a substantially stable, non-foaming aqueous emulsion comprising approximately 97% of a sodium hydroxide neutralized sulfonated extract of a 200 Saybolt seconds viscosity at 100° F. naphthenic type petroleum, approximately 0.25% aluminum stearate and approximately 2% of emulsion promoter comprising a polyhydric alcohol and tall oil.

14. A composition of matter capable of forming a substantially stable, non-foaming aqueous emulsion consisting of a metal salt of stearic acid in an amount within the range of 2% to 5% and a sodium hydroxide neutralized sulfonated extract of a 200 Saybolt seconds viscosity at 100° F. naphthenic type petroleum oil.

JERE C. SHOWALTER.

REFERENCES CITED

The following references are of record in the file of this patent:

UNITED STATES PATENTS

| Number | Name | Date |
| --- | --- | --- |
| 2,216,485 | Brandt | Oct. 1, 1940 |
| 2,230,556 | Zimmer | Feb. 4, 1941 |
| 2,307,744 | Liberthson | Jan. 12, 1943 |
| 2,308,116 | Silverman | Jan. 12, 1943 |
| 2,320,263 | Carlson | May 25, 1943 |
| 2,328,727 | Lange | Sept. 7, 1943 |
| 2,330,163 | Waldo | Sept. 21, 1943 |
| 2,338,613 | Zimmer | Jan. 4, 1944 |
| 2,361,476 | Higbee | Oct. 31, 1944 |